(12) United States Patent
Veltrop et al.

(10) Patent No.: US 8,336,286 B2
(45) Date of Patent: Dec. 25, 2012

(54) PUSH CHAIN WITH A BIAS SPRING TO PREVENT BUCKLING

(75) Inventors: Loren Veltrop, Chicago, IL (US); Donald Van Erden, Grayslake, IL (US); Paulette Van Erden, legal representative, Grayslake, IL (US)

(73) Assignee: Prince Castle LLC, Carol Stream, IL (US)

( * ) Notice: Subject to any disclaimer, the term of this patent is extended or adjusted under 35 U.S.C. 154(b) by 424 days.

(21) Appl. No.: 12/703,565

(22) Filed: Feb. 10, 2010

(65) Prior Publication Data

US 2011/0192133 A1  Aug. 11, 2011

(51) Int. Cl.
*B65D 5/66* (2006.01)
*F16G 13/20* (2006.01)

(52) U.S. Cl. ...... 59/78; 59/84; 59/93; 59/35.1; 222/113; 222/333; 254/95

(58) Field of Classification Search ............. 59/78, 80, 59/84, 93, 35.1; 222/113, 333, 392; 254/95
See application file for complete search history.

(56) References Cited

U.S. PATENT DOCUMENTS

| | | | |
|---|---|---|---|
| 1,276,117 A * | 8/1918 | Riebe | ............... 59/78.1 |
| 1,591,693 A | 7/1926 | Atz | |
| 2,045,261 A | 6/1936 | Chute | |
| 3,031,066 A | 4/1962 | Leach | |
| 3,051,264 A | 8/1962 | Batchelor | |
| 3,782,598 A | 1/1974 | Basa | |
| 3,831,455 A | 8/1974 | Patrignani | |
| 3,976,166 A | 8/1976 | Charpentier | |
| 4,154,153 A | 5/1979 | Stickle | |
| 4,318,499 A | 3/1982 | Hamilton | |
| 4,840,023 A * | 6/1989 | Borsani | ............... 59/78.1 |
| 4,929,113 A | 5/1990 | Sheu | |
| 4,984,952 A | 1/1991 | Reuter | |
| 5,064,098 A | 11/1991 | Hutter, III et al. | |
| 5,295,614 A | 3/1994 | Chang | |
| 5,323,931 A | 6/1994 | Robards, Jr. et al. | |
| 5,479,460 A | 12/1995 | Wrobel | |
| 5,970,701 A * | 10/1999 | Roden et al. | ............... 59/78 |
| 5,979,538 A | 11/1999 | Braun et al. | |
| 6,109,424 A | 8/2000 | Doan | |
| 6,148,925 A | 11/2000 | Moore | |
| 6,224,037 B1 | 5/2001 | Novick | |
| 6,321,945 B1 | 11/2001 | Girouard et al. | |
| 6,354,793 B1 | 3/2002 | Gammerler et al. | |
| 6,374,589 B1 * | 4/2002 | Kunert et al. | ............... 59/78.1 |

(Continued)

FOREIGN PATENT DOCUMENTS

DE  3513880 A1  10/1986
(Continued)

OTHER PUBLICATIONS

DE 4216541 A1 Translation (Abstract and Description).
(Continued)

*Primary Examiner* — David B Jones (57) ABSTRACT

A motion transmitting drive chain (drive chain) is prevented from buckling by applying a relatively small compressive bias force to one side of the pins around which the chain links rotate. The bias force is applied on the locking projection side of the pins axes of rotation such that the links are urged to rotate in the direction required to lock them against each other.

11 Claims, 13 Drawing Sheets

U.S. PATENT DOCUMENTS

| | | |
|---|---|---|
| 6,386,401 B1 | 5/2002 | Dodd et al. |
| 6,413,185 B1 | 7/2002 | Baginski et al. |
| 6,427,823 B1 | 8/2002 | Ishikawa et al. |
| 6,543,311 B1 | 4/2003 | Baginski et al. |
| 6,702,094 B2 | 3/2004 | Ishikawa et al. |
| RE38,555 E | 7/2004 | Braun et al. |
| 6,981,621 B2 * | 1/2006 | Brandeis et al. ............. 222/392 |
| 7,270,619 B2 | 9/2007 | Bourc'His |
| 2002/0056538 A1 | 5/2002 | Shaffer |
| 2003/0205356 A1 | 11/2003 | Braun et al. |
| 2004/0173408 A1 | 9/2004 | Szymanski et al. |
| 2004/0177934 A1 | 9/2004 | Olmsted |
| 2005/0145653 A1 | 7/2005 | Brandeis et al. |
| 2005/0242228 A1 | 11/2005 | Wagner et al. |
| 2006/0163007 A1 | 7/2006 | Bukowski et al. |
| 2008/0083167 A1 | 4/2008 | Olmsted et al. |
| 2008/0264971 A1 | 10/2008 | Harre et al. |
| 2009/0008615 A1 | 1/2009 | Young et al. |
| 2009/0019724 A1 | 1/2009 | Wagner et al. |
| 2009/0159613 A1 | 6/2009 | Rusch |
| 2009/0224006 A1 | 9/2009 | Post et al. |

FOREIGN PATENT DOCUMENTS

| | | |
|---|---|---|
| DE | 4216541 A1 | 11/1993 |
| EP | 0403576 B1 | 12/1990 |
| EP | 4035000076 | 12/1990 |
| EP | 8762000031 | 11/1998 |
| EP | 0936378 A1 | 8/1999 |
| EP | 0969226 B1 | 1/2000 |
| EP | 9692000026 | 1/2000 |
| EP | 0994231 B1 | 4/2000 |
| EP | 9942000031 | 4/2000 |
| EP | 1006000074 | 6/2000 |
| EP | 1591000402 | 11/2005 |
| EP | 1591000693 | 11/2005 |
| EP | 2019000278 | 1/2009 |
| GB | 4624000022 | 3/1937 |
| GB | 2076473 A | 10/1980 |
| JP | 2001254796 A | 9/2001 |
| JP | 2003314630 A | 11/2003 |
| JP | 2004108473 A | 4/2004 |
| JP | 2005282745 A | 10/2005 |
| JP | 2005337346 A | 12/2005 |
| JP | 2007289856 | 8/2007 |
| JP | 2007-289856 | 11/2007 |
| WO | WO 8911602 | 11/1989 |
| WO | WO 2006005942 | 1/2006 |
| WO | WO 2007122129 | 11/2007 |

OTHER PUBLICATIONS

USPTO Office Action Dated Apr. 11, 2012 for U.S. Appl. No. 12/684,597 (Filing Date Jan. 8, 2010).

USPTO Office Action Dated Apr. 11, 2012 for U.S. Appl. No. 12/684,597 (Filing Date Jan. 8, 2010) Examiner Search strategy.

European Search Report—Application No. EP 11 15 2687, Jul. 13, 2011.

State of Intellectual Property Office of the People's Republic of China The First Office Action Issue date Jun. 25, 2012; Application No. 20111003407.X; Issue No. 2012061901025260; Applicant: Prince Castle LLC; Title: Rodless Dispenser for Extrudable Materials and Having a Contents Indicator.

* cited by examiner

PUSH CHAIN WITH A BIAS SPRING TO PREVENT BUCKLING

BACKGROUND

Motion-transmitting drive chains are well known. Such chains are alternately known as or referred to as push chains, drive chains, and thrust chains. Regardless of what they are called, motion-transmitting drive chains are able to transmit an axial compressive load as well as exert a tensile force. Common chain on the other hand is incapable of transmitting a compressive load and is only able to exert a tensile force.

Motion-transmitting drive chains and common chains are both made up of successive, flexibly-connected links which are joined to each other by pins. In a common chain, the links are freely able to rotate around the pins in both directions. Unlike the links of a common chain, the links of a motion-transmitting drive chain are able rotate in only one direction. When the links of a drive chain are urged to rotate in the opposite direction, the chain becomes rigid and thereafter able to transmit a compressive axial load.

A problem with prior art drive chains is their susceptibility to buckling, if the line of action of a compressive force tends to rotate the links in the wrong direction or if the links are not sufficiently loaded to keep them locked. A drive chain that pre-loads the links of a drive chain such that they are less susceptible to buckling would be an improvement over the prior art.

DETAIL DESCRIPTION

Figure 1:
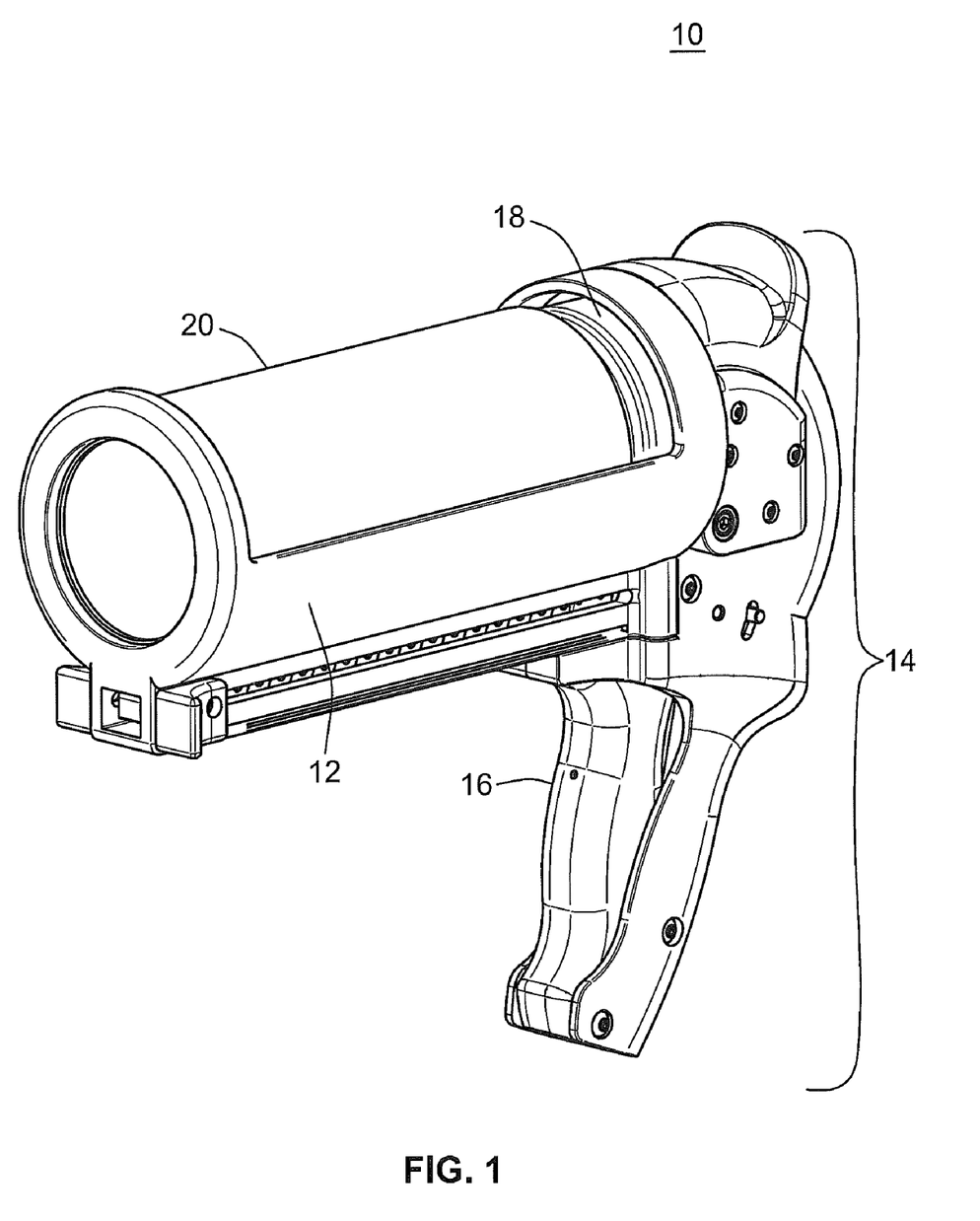
FIG. 1 is a perspective view of a rodless dispenser for extrudable materials.

FIG. 1 is a perspective view of a rodless dispenser for extrudable materials 10. The dispenser 10 is comprised of a housing 12 attached to a handle assembly 14. A reciprocating trigger 16 drives a chain sprocket located inside the handle assembly 14. Rotation of the sprocket by actuating the trigger 16 causes a drive chain to be pulled from a chain magazine 29 and driven into the back side of a piston 18. The piston 18 drives a second piston inside of a tube 20 of extrudable material.

Figure 2:
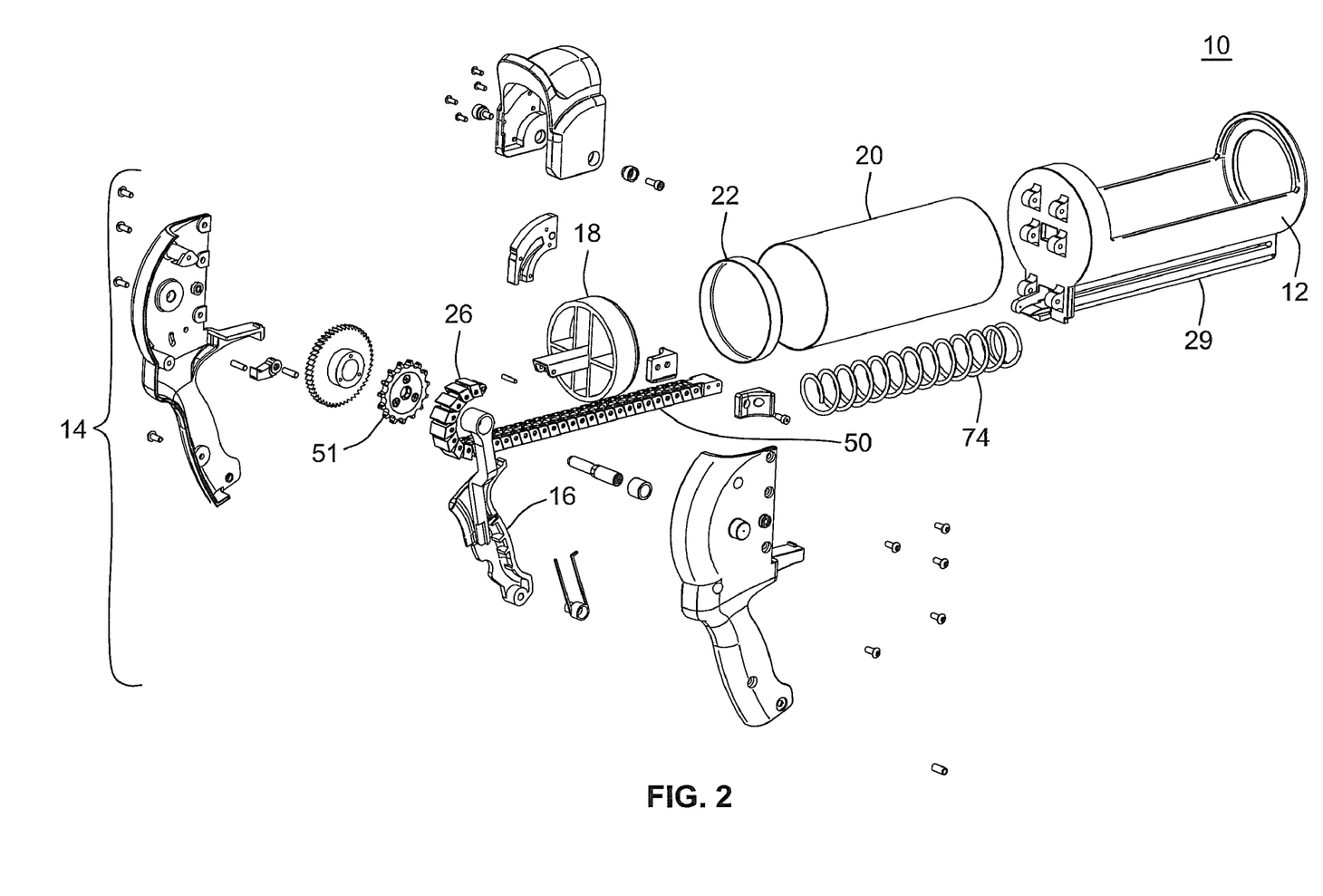
FIG. 2 is an exploded view of the dispenser shown in FIG. 1.

FIG. 2 is an exploded view of the dispenser 10 shown in FIG. 1 showing the drive chain 50, among other things. The drive chain 50 is a motion-transmitting drive chain. It has a forward or first end 26 rotatably coupled to the backside of the piston 18. It also has a rearward or second end 28 inside a magazine 29 that stores the chain. The drive chain 50 rotates on, and is driven by, a sprocket 51 which is itself driven by the trigger assembly 16. A description of the dispenser 10, its components and operation is provided in a U.S. patent application serial number that was filed Jan. 8, 2010, having U.S. application Ser. No. 12/684,597 and which is entitled, Rodless Dispenser. The contents of application Ser. No. 12/684,597, is incorporated herein by reference in its entirety.

Figure 3:
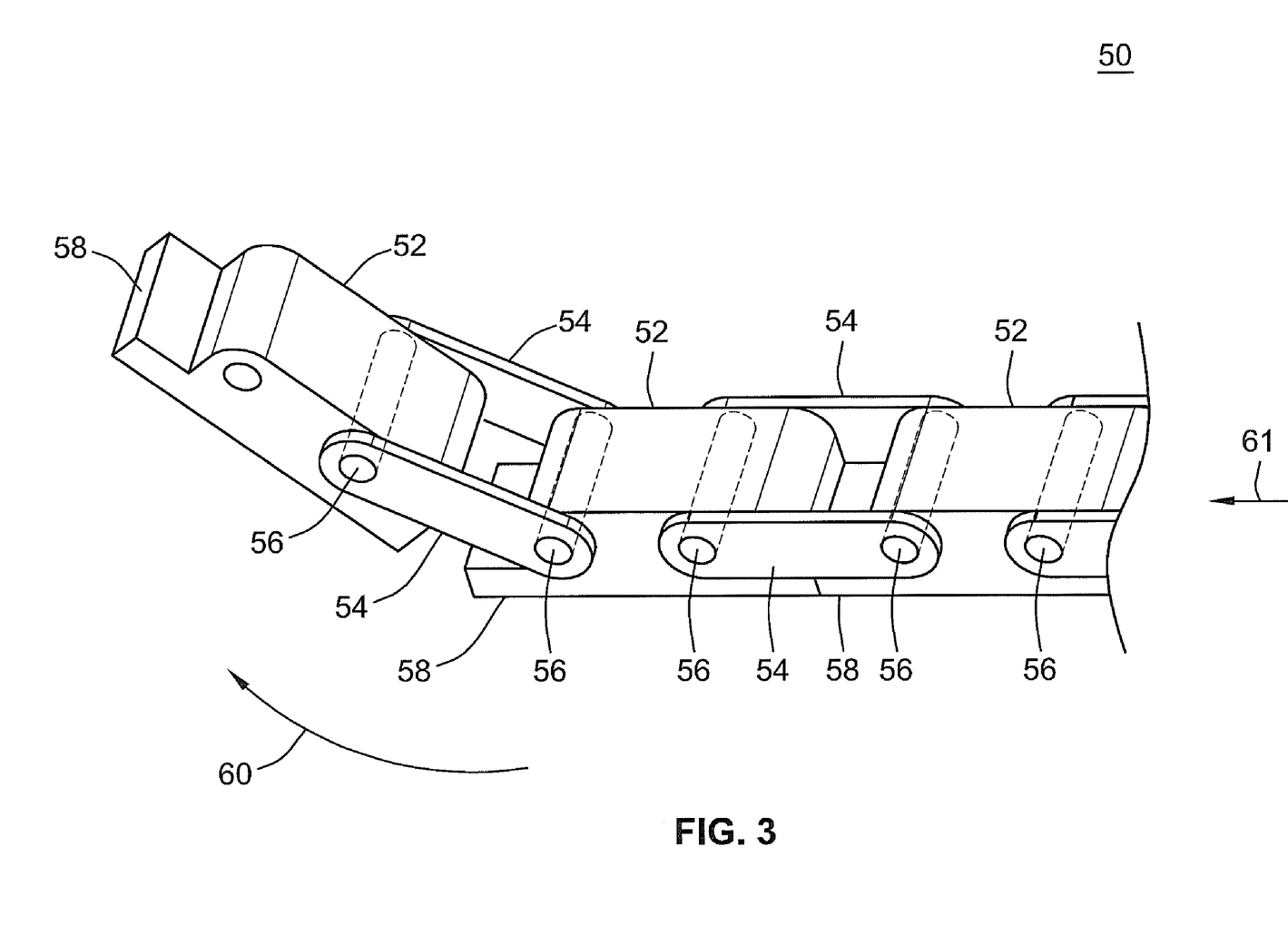
FIG. 3 is a perspective view of an isolated portion of a drive chain.

FIG. 3 is a perspective view of an isolated portion of a drive chain 50. The drive chain 50 is comprised of a link body 52. Holes are drilled or otherwise formed in the link body 52, just below the top surface 76, which accept pins 56 that attach the link bodies 52 to each other via link connectors 54. The link connectors 54 and the pins 56 are sized, shaped and arranged to allow the link connectors 54 and therefore adjacent link bodies 52 to rotate around the pins 56. The link bodies 52 are thus able to rotate around the pins 56, in at least one direction because of one or more interlocking projections 58, which extend away from the link bodies 52 parallel to the axis of the chain 50. The projections 58 are therefore considered to be axially-extending interlocking projections.

As can be seen in FIG. 3, the bottom 78 of each link body 52 has an elongated projection 58 that extends away from the link body 52 at one end thereof. A projection 58 from one link body 52 abuts and interlocks with an adjacent link body 52 such that the link body 52 and the link connectors 54 are able to rotate around the pins 56 in only one direction. In FIG. 3, the link bodies 52 and projections 58 permit the links (link bodies, pins and link connectors) to rotate in only a clockwise direction 60 as shown. Application of a bias or pre-load compressive force 61 in the axial direction, i.e., lengthwise down the axis of the chain 50 can prevent the chain links from buckling, i.e., rotating around each other, if the force 61 is properly applied.

Figures 4, 5:
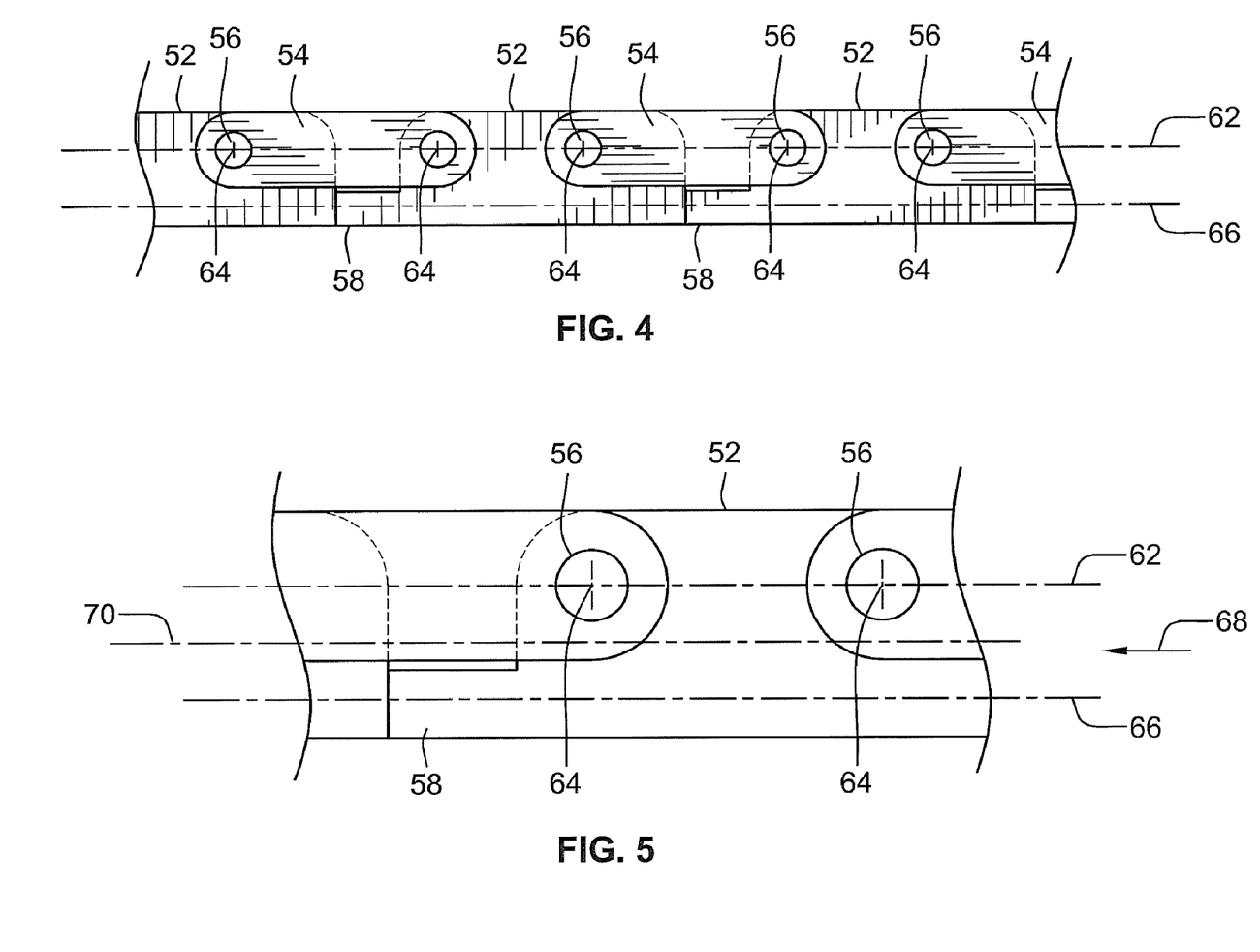
FIG. 4 is a side view of the drive chain shown in FIG. 3.
FIG. 5 is an isolated view of a link body of a drive chain shown in FIG. 4.

FIG. 4 is a side view of the drive chain shown in FIG. 3. FIG. 5 is an isolated view of a link body 52 shown in FIG. 4.

In FIG. 4 and FIG. 5, reference numeral 62 identifies a geometric plane that extends into the plane of FIG. 4 and FIG. 5 and which is co-planar or substantially co-planar with the geometric axes of rotation 64 for each pin 56 shown in FIG. 4 and FIG. 5. The geometric axes of rotation 64, i.e., the geometric centers of the pins 56 are therefore co-planar or substantially co-planar with the first geometric plane 62.

Reference numeral 66 identifies a second geometric plane which is displaced "vertically" from the first plane 62 as the two planes are shown in the figures. The second plane 66 is also parallel to the first plane 62 and cuts horizontally through the geometric centerline of the projections 58 shown in the figure. The distance separating the first plane 62 from the second plane 66 is considered a separation distance of the pins 56 from the projections 58.

In FIG. 5, reference numeral 68 identifies a vector that represents a compressive force applied to the links 50 from a source not visible in FIG. 5. The force/vector 68 has a line of action 70 located between the first plane 62 and the second plane 66. The application of the force 68 on the second-plane 66 side of the first plane 62 results in a clockwise torque around the pins 56 due to the fact that the line of action 70 of the force 68 is vertically separated from the centerline 62 of the pins 56 by a non-zero distance. Stated another way, the force 68 has a line of action on the second-plane side of the first plane 62 such that the force 68 tends to rotate the link bodies 52 clockwise around the axes of rotation 64. Clockwise rotation of the link bodies 52 around the axes 64 will urge the projections 58 of a link body 52 into an adjacent link body 52. Driving a projection on one link body 52 into an adjacent link body causes the axial aligned projections 58 to interlock adjacent links. Driving the projections 58 into the link bodies will therefore prevent or tend to prevent the drive chain from buckling, i.e., rotating in the opposite direction due to the absence of a force to keep the links locked together.

The force represented by the vector 68 is preferably supplied to a drive chain by one or more types of springs wrapped around the chain's links or contained within the links of the drive chain 50.

Figure 6:
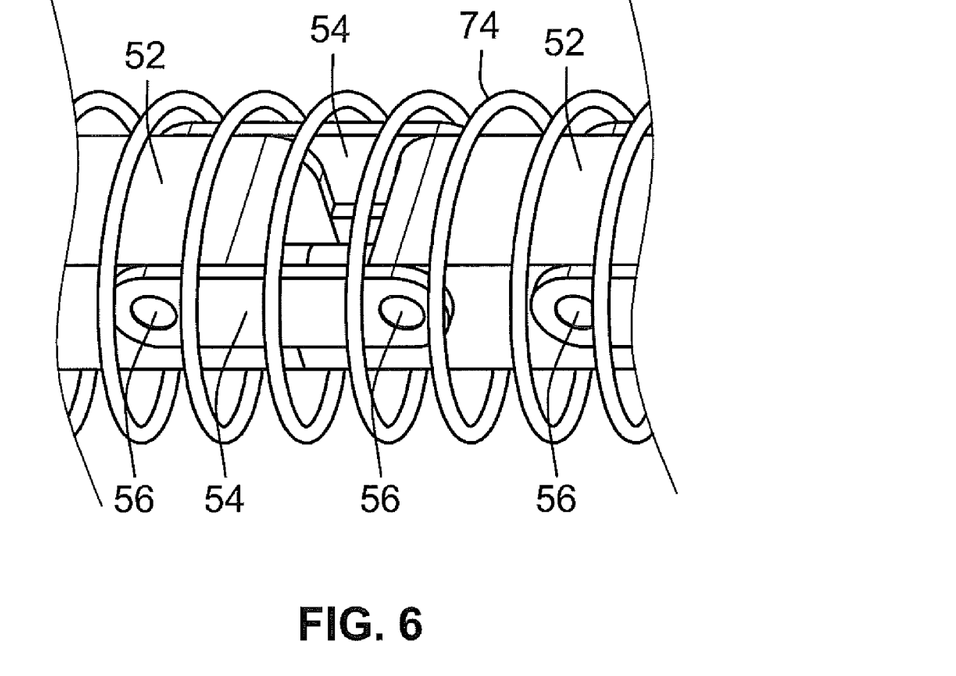
FIG. 6 depicts a coil spring wrapped around the outside of a drive chain to provide a compressive bias force.

FIG. 6 depicts a coil spring 74 having a substantially circular cross section, wrapped around the outside of a drive chain 50, such the drive chain 50 shown in FIG. 2 as well as a drive chain comprised of links 50 shown in FIGS. 3, 4 and 5. Those of ordinary skill in the art will recognize that the shape and dimensions of the spring need to be selected to allow the spring to freely pass through the interior of the spring in order to allow the spring and chain links to move independently of each other.

Figure 7:
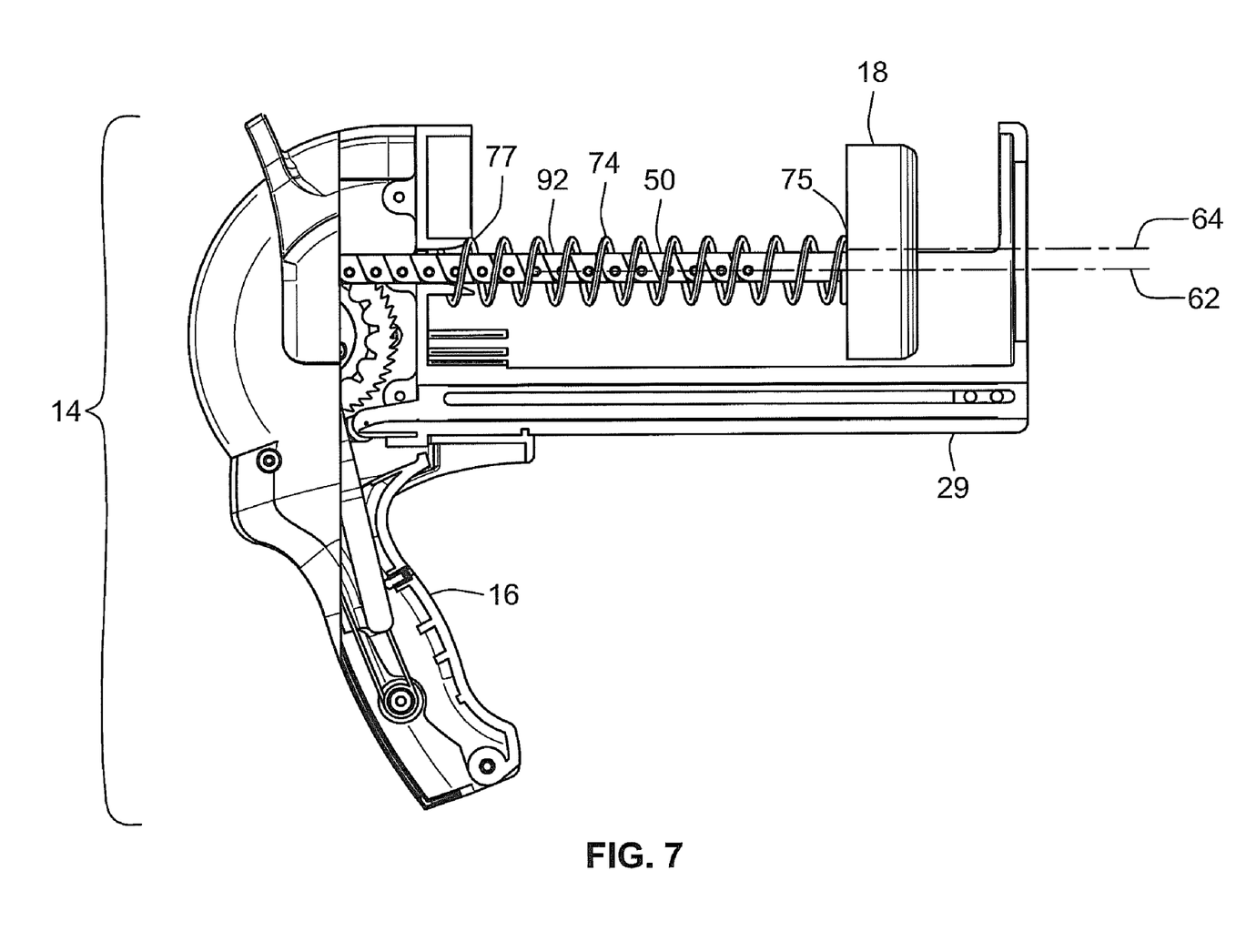
FIG. 7 is a side view of the dispenser shown in FIG. 1, with the housing removed to reveal a drive chain through the interior of a coil spring.

FIG. 7 is a side view of the dispenser 10 shown in FIG. 1 albeit with the housing 12 removed to reveal how the drive chain 50 passes through the interior of the coil spring 74. In FIG. 7, a first forward end 75 of the spring 74 is attached to the back side of the aforementioned piston 18. A second, rearward end 77 is attached to a stanchion part of the dispenser 10, an example of which includes a hook (not visible in FIG. 7) as part of the handle assembly 14.

Piston movement toward the right side of FIG. 7 increases tension in the spring 74. Piston movement to the left side of FIG. 7 decreases tension in the spring 74. The compressive force 68 on the chain 50 that is identified in FIG. 6 by reference numeral 68 is provided by attachment of the forward end 75 of the spring 74 to the back side of the piston 18 at an attachment point 79. The location of the spring attachment point 79 is selected so that the line of action 64 of the spring's compressive force tends to rotate the links of the chain 50 in a counter-clockwise (as shown) direction, i.e., such that the compressive force acts through a line of action on the projection 58 side of the pins' axes of rotation 64. In FIG. 7, the chain 50 is configured to rotate around a handle-mounted sprocket as shown but not rotate in the opposite direction. Properly selecting the location of the spring attachment point 79 and the spring force line of action 64 will therefore cause the axial aligned projections of each link in the chain 50 to lock to an adjacent link as described above.

In FIG. 7, the central axes of the pins 56 of the chain 50 lie in a geometric plane identified by reference numeral 62. The axially-aligned projections 92 lie in or parallel to the first plane 62 as well as a second geometric plane identified by reference numeral 64 and which passes through the projections 92 of the spring 50. For reasons described above, the application of a compressive force on the second-plane 64 side of the first plane 62 will cause the links to rotate the axial projections 58 of each link body, against a link body of an adjacent link.

Figure 8:
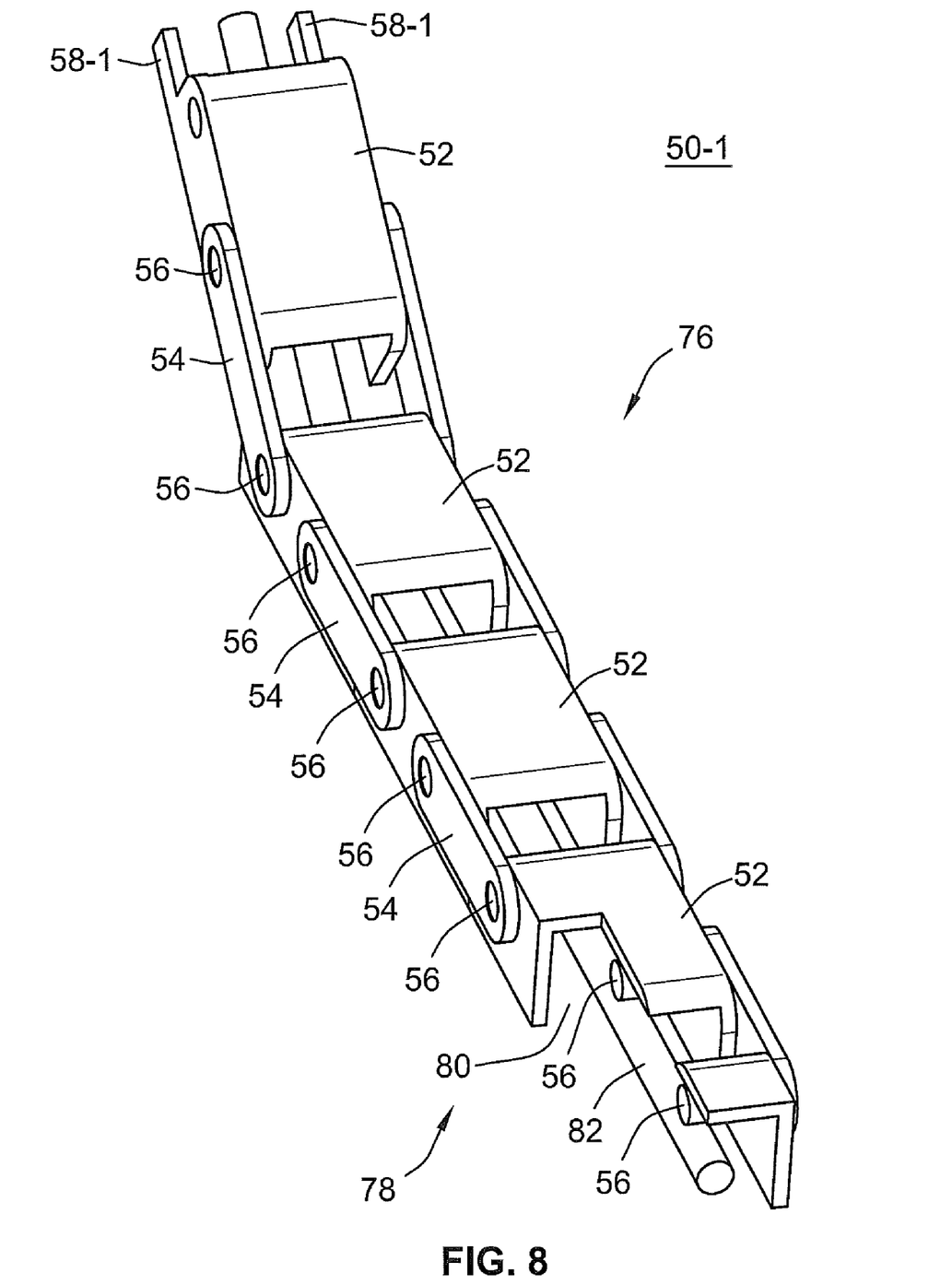
FIG. 8 depicts an alternate embodiment of a drive chain.

FIG. 8 depicts an alternate embodiment of a drive chain 50-1 having a spring that applies a pre-load bias force to help prevent the drive chain from buckling. In this embodiment, each link body 52 has a first or top side 76 that is substantially planer and smooth. A second, underside 78 is formed to have an open passageway 80. When the link bodies 52 are adjacent to each other as shown, the open passageway 80 of each link body form an elongated passageway that can receive an elongated elastic rubber band or elastic string 82.

As shown in the figure, a compressive force exerted by the elastic string 82 will be applied "below" the pins 56 as shown, and therefore "below" the pins' axes of rotation. Applying a compressive load as shown in FIG. 8 will cause the link bodies 52 to rotate in a clockwise direction (when viewed from the left) such that the interlocking projections 58-1 will abut and lock against adjacent link bodies 52.

Spring motors are spring-powered retraction devices. Spring motors are commonly used to retract seat belts, among other things. In an alternate embodiment of the chain shown in FIG. 8, the elastic spring 82 is replaced by an appropriately-sized spring motor.

Figure 9:
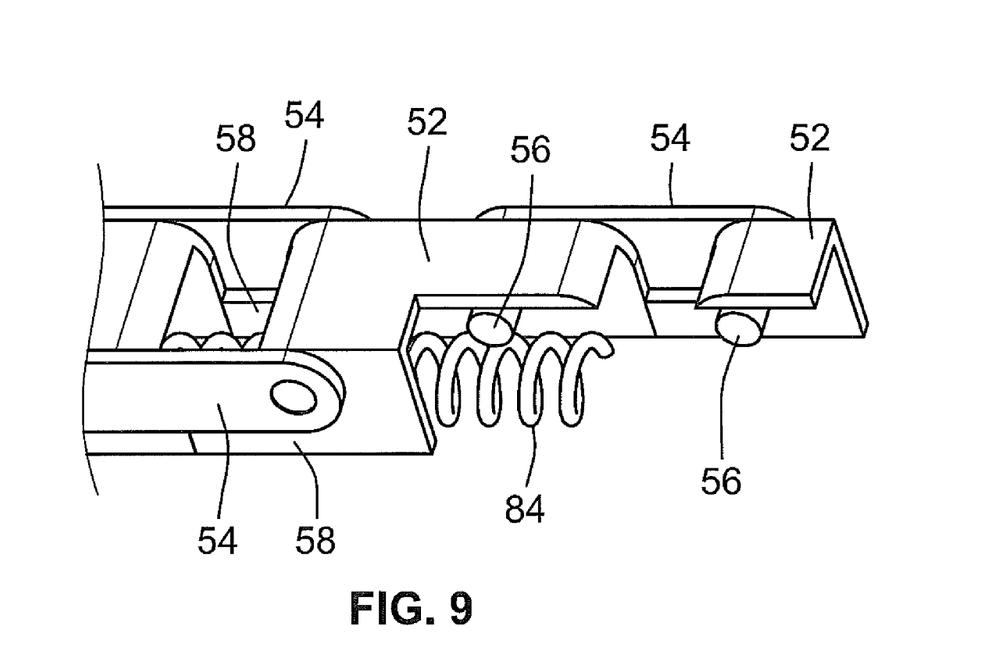
FIG. 9 depicts another alternate embodiment of a drive chain.

FIG. 9 depicts an alternate embodiment of a motion-transmitting drive chain that is pre-loaded or pre-biased by a spring. In FIG. 9, a relatively small-diameter coil spring 84 extends through the passageway 80 in the underside or bottom 78 of the chain 50.

Figure 10:
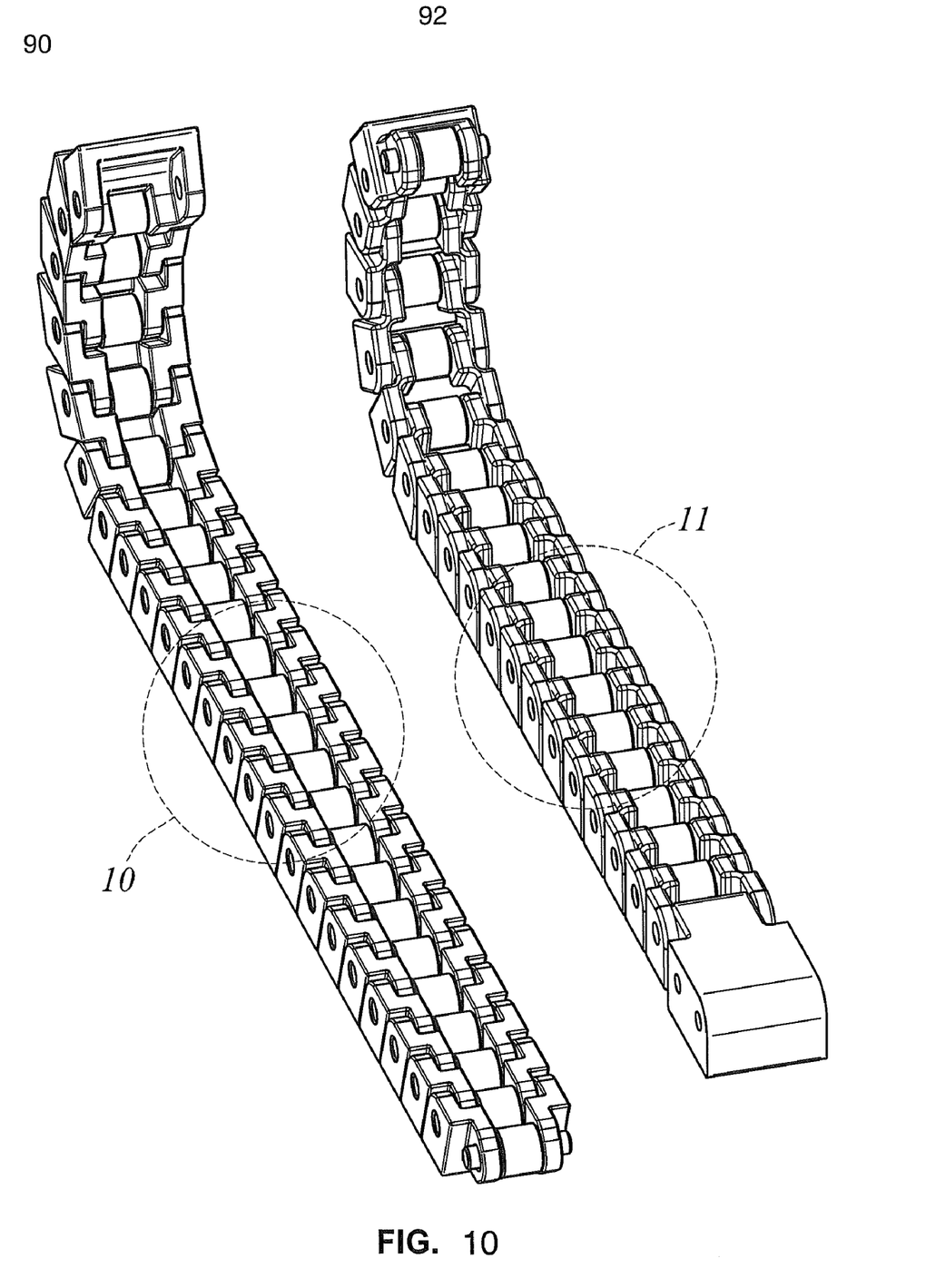
FIG. 10 depicts two alternate embodiments of a drive chain 90 and 92.

FIG. 10 depicts two alternate embodiments of a drive chain 90 and 92, the links of which are configured to rotate in a first direction but not in an opposite second direction. The drive chains depicted in FIG. 10 are capable of being used with or without a bias spring described above to prevent their buckling. A first embodiment 90 and a second embodiment 92 are comprised of link bodies 94 and 96 respectively, link connecting pins 98 not visible in FIG. 10, and bearings 100, through which the connecting pins 98 extend. The chain embodiments depicted in FIG. 10 do not require the link connectors 54 described above and depicted in FIG. 3, et al.

Figure 11:
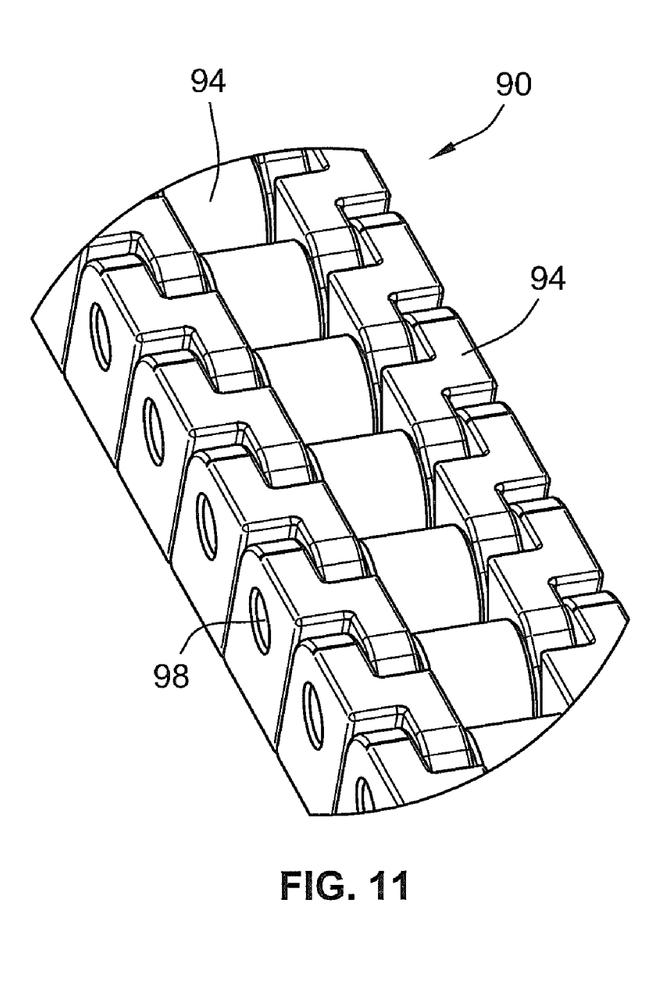
FIGS. 11 and 12 are isolated views of the links of the alternate embodiments depicted in FIG. 10.
Figure 12:
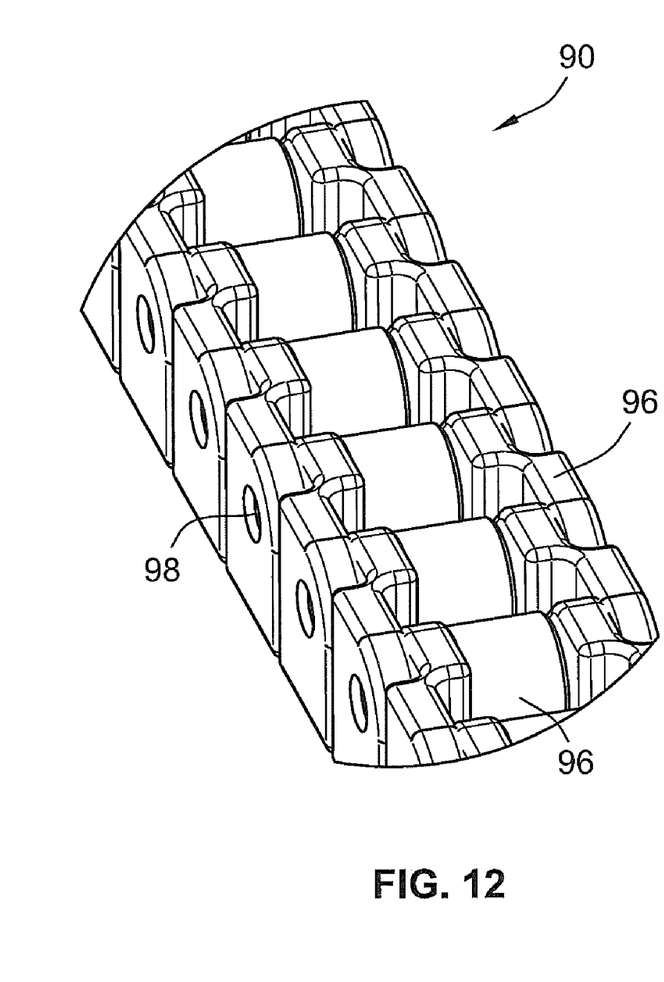

FIGS. 11 and 12 are isolated views of the links of the alternate embodiments depicted in FIG. 10. Both chains are configured to enable their respective link bodies 92 and 94 to rotate in one direction but to interlock against each other when the chains or individual link bodies are urged to rotate in an opposite, second direction. The link bodies of both chains are sized, shaped and arranged as shown to form knuckle joints. The chain links formed from such knuckle joints do not require a separate link connector, such as the link connector 54 described above and depicted in the figures.

Knuckle joints are themselves well known. One such joint is shown and described in U.S. Pat. No. 4,929,113, which was issued to Sheu and entitled "Knuckle Joint." The teachings of Sheu are incorporated herein by reference, at least with regard to the structure and operation of a knuckle joint.

Paraphrasing Sheu, a knuckle joint comprised of two inter-engaging pieces. A first piece is formed to have two, spaced-apart and side-by-side projections that enter a mating jaw. The jaw or second piece is also comprised of two, spaced-apart side-by-side projections of a second piece, however, the space between the side-by-side projections of the jaw are wider than the space between the side-by-side projections of the first piece.

Both pairs of projections on each piece have a hole or an "eye" through which a pin member can be inserted and around which the pieces will rotate. Stated another way, the pin passes through the eyes formed in the two projections of the first piece, and through the two eyes of the mating projections of the second piece. Unless there is some external limiter, a knuckle joint can be pivotally rotated in both directions around the pin.

Figure 13:
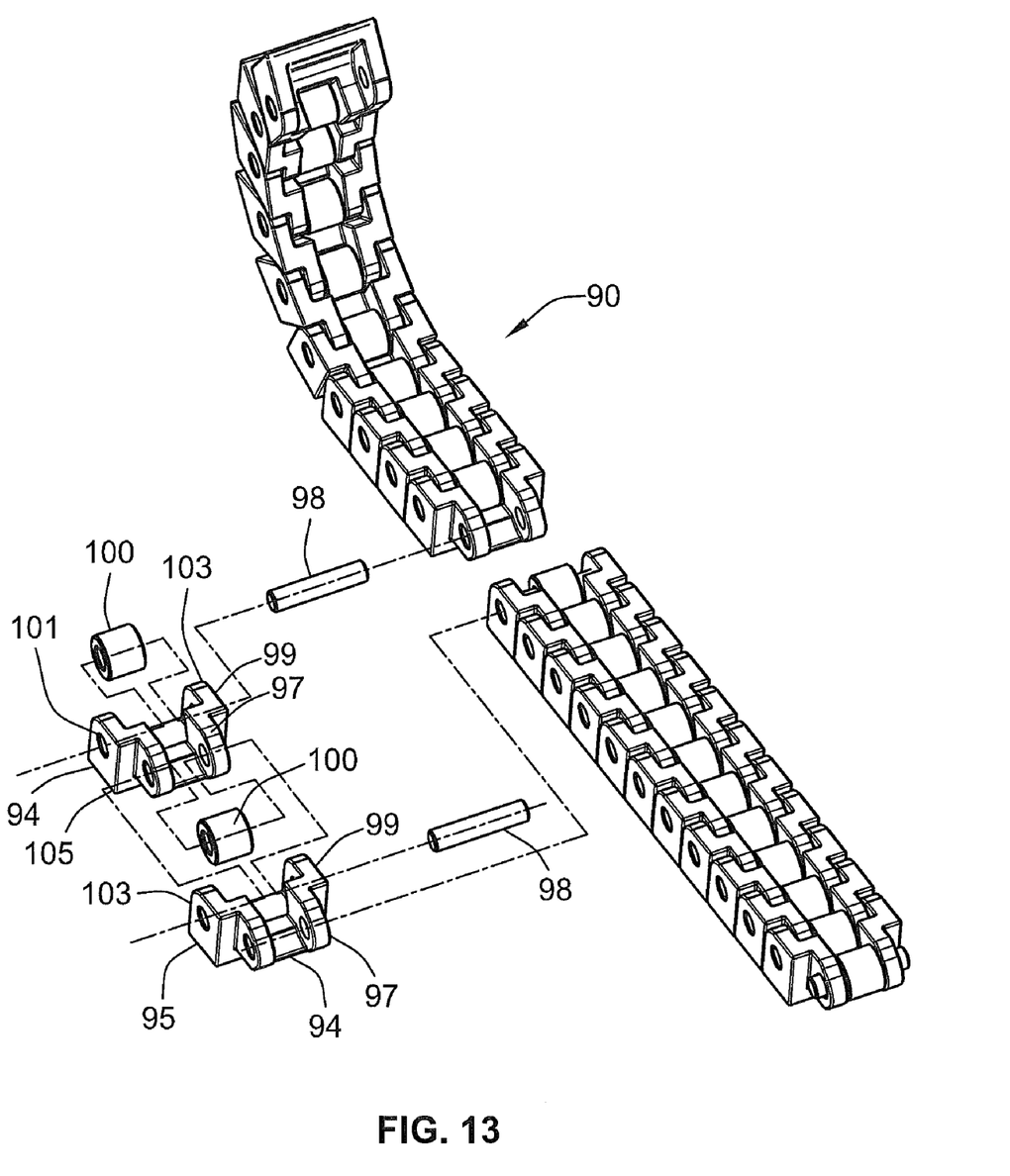
FIG. 13 is an exploded view of two link bodies depicted in FIG. 11.

FIG. 13 is an exploded view of two individual link bodies 94 of the chain 90 depicted in FIG. 11. Each link body 94 is comprised of the aforementioned first and second pieces, one being a knuckle joint jaw. A complete knuckle joint is formed when the second or jaw end 99 of one link body 94 is joined to the first end 97 of a second link body 94 and a connection pin 98 is inserted into the eyes formed in all of the projections. A bearing 100 keeps the first and second pieces aligned within the jaws.

In the figures, the two projections of the narrow end identified by reference numeral 97 are sized, shaped, and arranged to freely slide within the interior walls of the jaw formed by two projections identified by reference numeral 99. A bearing sleeve 100 is sized, shaped, and arranged to fit within the interior walls of the narrow end projections 97. A similar bearing 98 fits within the internal space of the jaw projections 99.

Top "corners" 103 of the jaw portion 99 are rounded. Directly below the rounded corners 103 the corners 95 are squared off as shown. The rounded shoulders 103 allow the link bodies 94 to rotate in a counter-clockwise direction around each bearing 98, however, when the link bodies 94 are urged in a clockwise direction around the bearings 98, the squared-off corners 95 butt up against opposing faces 105 on an adjacent link body 94. The chain 90 shown in FIG. 13 as well as FIG. 11 and FIG. 10 is thus able to rotate in one direction (as shown, clockwise around the pins 98) but not the other.

Figure 14:
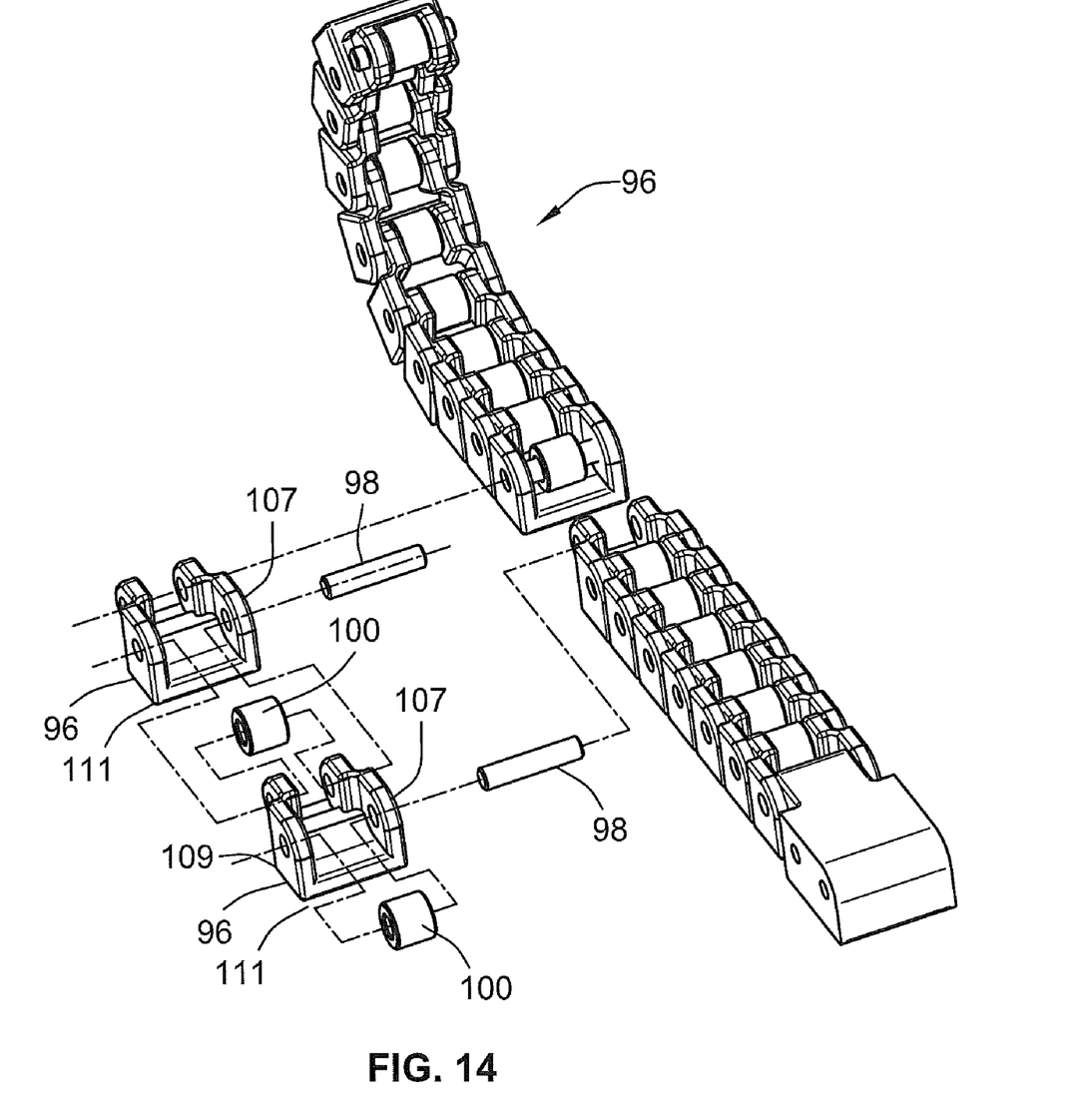
FIG. 14 is an exploded view of two link bodies shown in FIG. 12.

FIG. 14 is an exploded view of two link bodies 96 shown in FIG. 12. The link bodies 96 shown in FIG. 17 have an inclined or slanted leading side that terminates in a lower rounded lower shoulder 109 best seen FIG. 16. The rounded lower shoulder 109 permits the link bodies 96 to rotate around the bearings 98 whereas the squared-off upper corners interlock opposing corners 111 on an adjacent link body thus preventing the chain 96 from rotating in a clockwise direction as shown but allowing it to rotate in a counter-clockwise direction.

Figure 15:
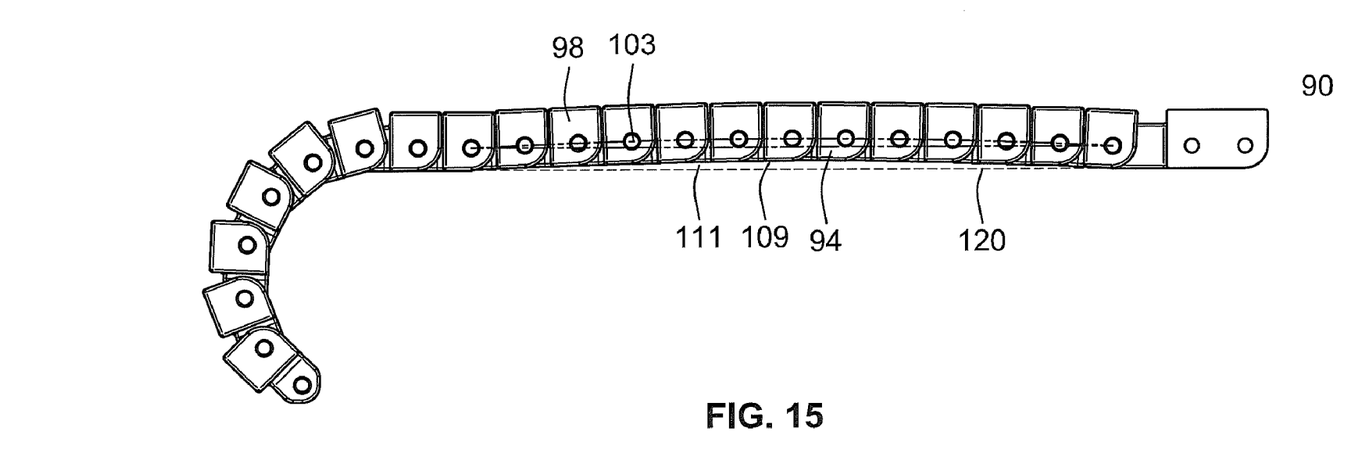
FIG. 15 is a side view of the chain 90 shown in FIG. 10 and FIG. 11.

FIG. 15 is a side view of the chain 90 shown in FIG. 10 and FIG. 11. It is important to note that the link bodies 94 are sized, shaped, and arranged such that when the chain 90 is resting, i.e. without any compressive load and, as shown in the figure, the chain has an upward or convex-shaped bow as shown. Stated another way, the center portion of the chain length deflects "upwardly" (as shown) from a horizontal reference line 120.

Figure 16:
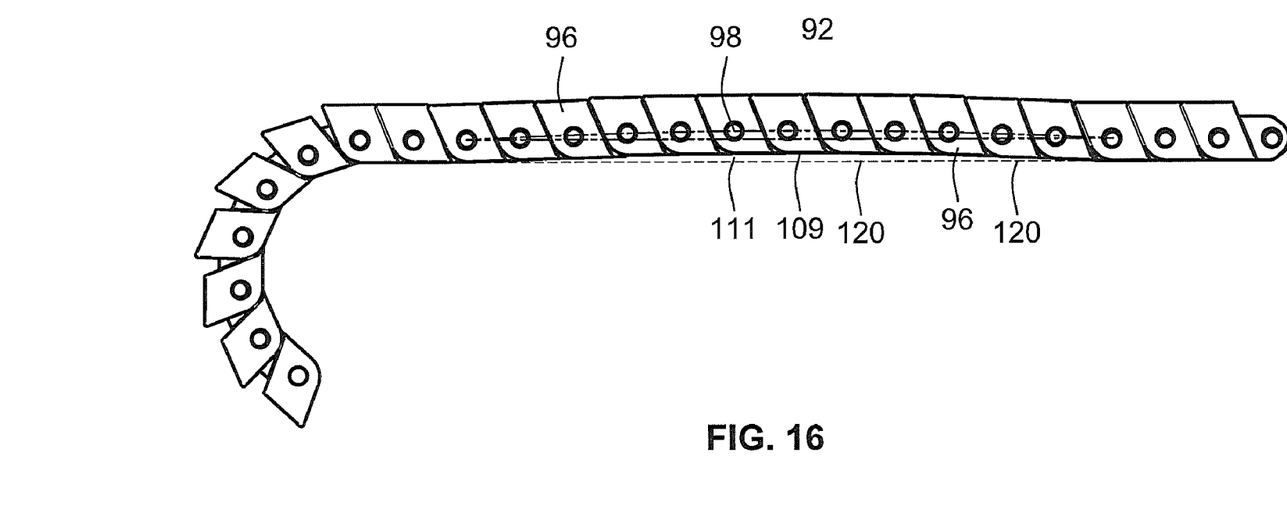
FIG. 16 is a side view of the chain 92 shown in FIG. 12 and in FIG. 10.

FIG. 16 is a side view of the chain 92 shown in FIG. 12 and in FIG. 10. As with the chain shown in FIG. 14, the link bodies 96 are sized, shaped, and arranged such that it when the chain 92 is resting as shown, it too has a slight upward (as shown) bow giving the chain a an upward or convex shape relative to a horizontal reference line 120.

Figure 17:
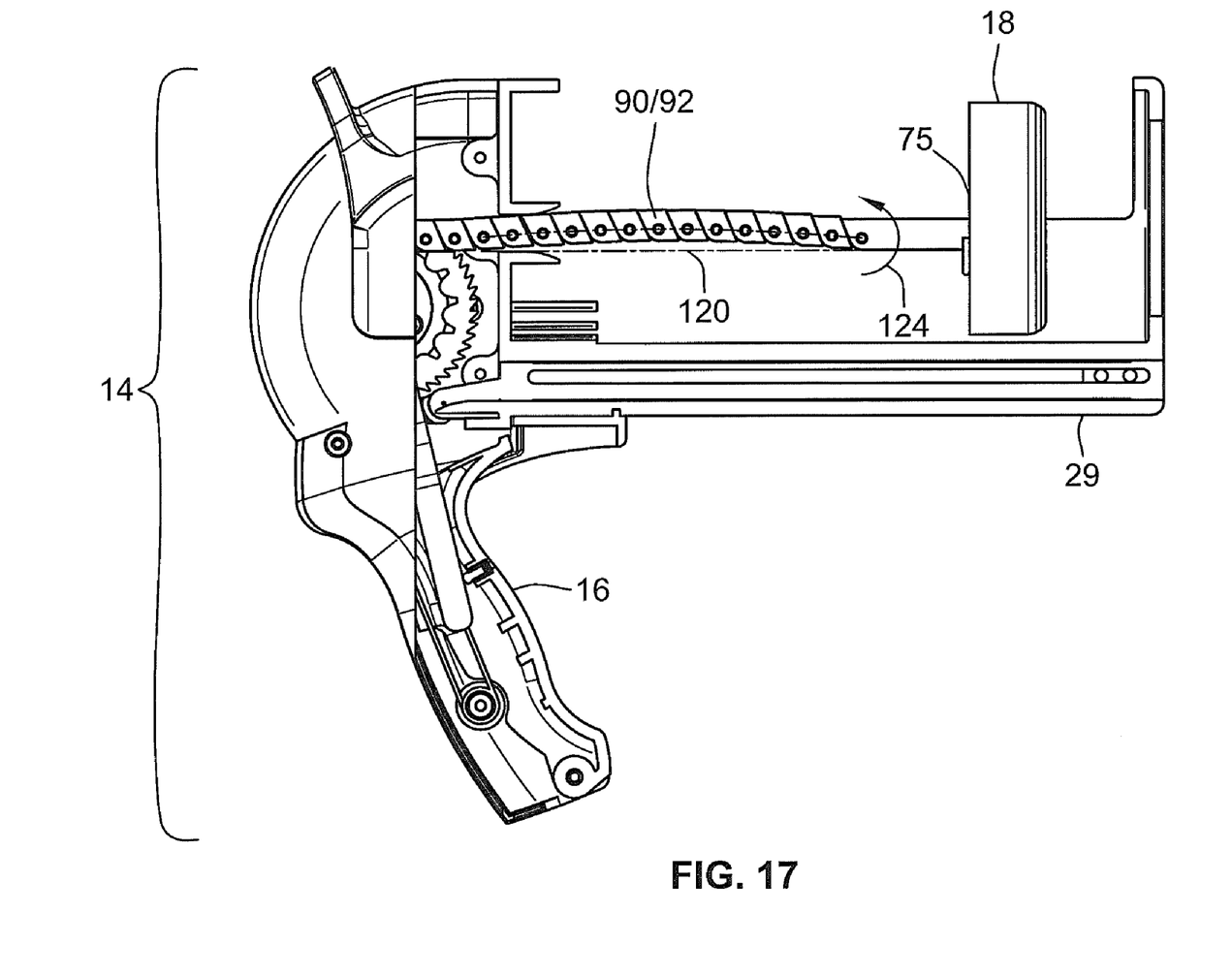
FIG. 17 is a side view of a push chain used in rodless dispenser for extrudable materials.

The convex shape of the chains at rest is important when a push chain or motion-transmitting drive chain is used to drive a load that will exert a torque on the chain that will tend to bend the chain downwardly, (as shown in the figures) such as a when a push chain is used in a rodless dispenser for extrudable materials shown in FIG. 17.

In FIG. 17, one of the aforementioned push chains 90 or 92 is shown at rest in a rodless dispenser for extrudable materials. The push chain exerts a compressive force on the back side 75 of a combination piston and fixed piston rod 18 in order to drive extrudable material from a tube of extrudable material, not shown.

The piston rod is located on the back side 75 of the piston such that an axial compressive force exerted on the piston 18 has a line of action through the piston that is below the center line of the piston but "above" the axis of rotation of the connecting pins holding the chain links together. In the chain shown in FIG. 17, the links will remain locked against each other (and the chain locked straight) as long as the axial reactive force from the piston has a line of action that is also above the axis of rotation of the pins that hold the chain link bodies together.

When the piston 18 shown in the figure encounters a resistance from extrudable material, a reactive force distributed across the piston face will act through a line extending through the piston's center line. Since the compressive force from the chain is below the piston's center line and the reactive force from the piston face is above the piston's center line, a reactive torque 124 is will be produced at the bottom end of the piston rod that will tend to rotate the piston and piston rod counterclockwise as shown. The reactive torque from piston rod will thus tend to straighten or flatten the chain from its at-rest location to be parallel to the reference line 120. If the push chain were initially flat relative to the reference line 120 or concave (opening upwardly), a reactive torque 124 could deflect the center part of the chain to an extent where a reactive axial force from the piston rod acted on a line below chain's connecting pins. Compressive force that acts on a line below the link pins axis or rotation will cause the links to unlock, i.e., rotate. The resting curve shown in FIG. 17 is thus important to maintain the chain's locked state if the chain is subjected to a reactive torque.

Those of ordinary skill in the art will recognize that a method of operating the drive chain is preferably comprised of applying a compressive force to the links in order to cause the links to rotate in a direction by which the links and the interlocking projections engage each other. The method of applying that compressive force is preferably a step of applying the compressive force as part of retracting the drive chain.

Those of ordinary skill in the art will also recognize that a mechanism by which a compressive force is applied to a spring can apply the compressive force such that the line of action for the compressive force is actually outside the link body 52. Such a mechanism would include an arm or other projection extending away from the link body 52.

In a device such as the aforementioned rodless dispenser, the spring 74 has a second or rearward end 77 attached to a point that is fixed in space relative to the spring and chain. In an alternate embodiment, a spring that provides a bias to a drive chain can also be connected to the chain, albeit toward the rearward end of the chain such that the spring is maintained in tension.

In an alternate embodiment of the rodless dispenser, and as shown in the patent applications incorporated herein by reference, a spring that exerts a bias force on the chain also acts to retract the chain into a chain magazine 29.

The foregoing description and examples are for purposes of illustration only. The true scope of the invention is defined by the appurtenant claims.

What is claimed is:

1. A motion transmitting drive chain comprised of:
   a forward end and a rearward end and a plurality of successive, flexibly-connected links between said forward and rearward ends, adjacent links having interlocking, axially-aligned projections for resisting compressive loads;
   and a spring having first and second ends, the first end of the spring being operatively coupled to the drive chain at a first spring attachment point, proximate the forward end of said spring;
   whereby the spring and attachment point are configured to apply a compressive force to at least some of the flexibly connected links of the drive chain located between the spring attachment point and the rearward end of the spring, the compressive force causing axially-aligned projections to interlock adjacent links;

wherein the links are comprised of pins having central axes of rotation, the pins flexibly connecting adjacent links to each other, the projections and the central axes of the pins being separated from each other by a separation distance wherein the spring and attachment point are selected such that compressive force acts through a geometric line of action located on the projection side of the central axes of the pins, the line of action being substantially orthogonal to said separation distance, whereby links are urged to rotate about said pins to interlock the projections;

wherein the attachment point is selected such that the line of action is located outside the links, on the projection side of the axes of rotation; and wherein the spring is a coil having a cross section selected to enable the links to pass through the interior of said coil.

2. The drive chain of claim 1, wherein first and second links form a knuckle joint.

3. The drive chain of claim 1, wherein the chain has an at-rest bow.

4. The drive chain of claim 1, wherein the links of the chain are sized, shaped and arranged to provide the chain a convex bow shape when the chain is unloaded.

5. The drive chain of claim 1, wherein the spring attachment point is on the projection side of the axes of rotation, whereby compressive force supplied by said spring acts through a geometric line of action on the projection side of the axes of rotation.

6. The drive chain of claim 1, wherein the second end of the spring is operatively coupled to a second spring attachment point located between the first spring attachment point and the rearward end of the drive chain, the spring maintaining a substantially constant compressive force on the drive chain.

7. The drive chain of claim 1, wherein the second end of the spring is attached to a stanchion fixed in space relative to said drive chain, whereby movement of the first spring attachment point away from said stanchion, increases the compressive force and whereby movement of the first spring attachment point toward said stanchion decreases the compressive force.

8. The drive chain of claim 1, further comprising a housing that contains at least part of the drive chain, wherein the second end of the spring is attached to the housing.

9. The drive chain of claim 8, wherein the housing comprises a chain magazine and wherein the spring is configured to retract the drive chain into the chain magazine.

10. The drive chain of claim 1, wherein the links are comprised of pins and interlocking, axially-aligned projections the pins having geometric center axes of rotation that lie in a first geometric plane, the projections lying in a second geometric plane, the first and second planes being substantially parallel and spatially-separated from each other by a first separation distance, wherein the compressive force acts through a line of action.

11. The drive chain of claim 10, wherein the spring is configured to apply compressive force through the line of action, which is located on the second-plane side of the first plane, the line of action between substantially parallel to the first and second planes.

* * * * *